United States Patent Office 3,324,000
Patented June 6, 1967

3,324,000
1,4-BENZODIOXYL CARBAMATES IN SKELETAL MUSCLE RELAXATION
Claude I. Judd, Mequon, Wis., assignor to Colgate-Palmolive Company, New York, N.Y., a corporation of Delaware
No Drawing. Filed Apr. 20, 1965, Ser. No. 449,642
16 Claims. (Cl. 167—65)

This application is a continuation-in-part of application Ser. No. 376,215, filed June 18, 1964, and now abandoned.

This invention relates to carbamates. More particularly, this invention is concerned with novel N-benzodioxyl carbamates, processes of producing such compounds and pharmaceutical uses for these compounds.

According to the present invention there are provided novel N-[2-(1,4-benzodioxyl)] carbamates of the formula

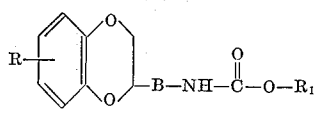

wherein R is hydrogen, a lower alkyl such as methyl, ethyl, propyl, isopropyl and butyl, a lower alkoxy such as methoxy, ethoxy, propoxy and butoxy, a halo substituent such as chloro, bromo, iodo or fluoro, a halo-lower alkyl group such as 2-chloroethyl and trifluoromethyl or a lower alkyl-thio such as methylthio and ethylthio, B is a single chemical bond or a straight or branched chain lower alkylene having up to 4 carbons in a chain, such as methylene, ethylene, isopropylene and butylene, and $R_1$ is a lower alkyl such as methyl, ethyl, propyl, isopropyl and butyl, an aryl group and particularly phenyl and lower alkoxy-phenyl such as p-methoxyphenyl, an aralkyl group and particularly a phenyl-lower alkyl such as benzyl, 1-phenethyl, 2-phenethyl, phenylisopropyl and 4-phenylbutyl, a cycloalkyl group particularly having 3 to 7 carbons in the ring such as cyclopropyl, cyclopentyl and cyclohexyl, and haloalkyl such as 2-chloroethyl, 2-bromopropyl, trifluoroethyl and 2,2,2-trichloroethyl.

The compounds of this invention may be produced by reacting an appropriate 1,4-benzodioxyl-2-isocyanate with and appropriate alcohol to form the N-[2-(1,4-benzodioxyl)] carbamates. This process can be represented as follows:

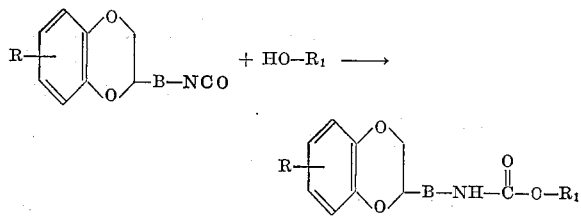

whrein B, R and $R_1$ have the significance previously assigned.

The 1,4-benzodioxyl-2-isocyanates used as starting materials may be produced by bringing a 1,4-benzodioxane-2-carbonyl chloride and sodium azide together in toluene, heating the mixture to boiling to form an intermediate acid azide which decomposes in situ to give the desired 1,4-benzodioxyl-2-isocyanate. The reaction mixture is filtered to remove salts. The 1,4-benzodioxyl-2-isocyanate can be isolated, if desired, but this is unnecessary since it can be used as present in the filtrate. The reaction may be represented as follows:

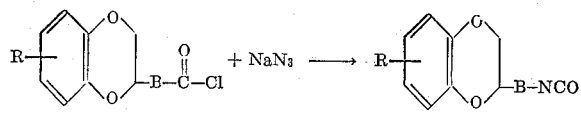

wherein B and R have the significance previously assigned.

Besides 1,4-benzodioxyl-2-isocyanate, other such compounds with nuclear substituents can be produced in this way including
5-methyl-1,4-benzodioxyl-2-isocyanate,
6-ethoxy-1,4-benzodioxyl-2-isocyanate,
8-trifluoromethyl-1,4-benzodioxyl-2-isocyanate,
7-benzyl-1,4-benzodioxyl-2-isocyanate,
5-chloro-1,4-benzodioxyl-2-isocyanate,
6-phenyl-1,4-benzodioxyl-2-isocyanate,
5-cyclohexyl-1,4-benzodioxyl-2-isocyanate, and
7-methylthio-1,4-benzodioxyl-2-isocyanate.

Some of the alcohols which can be used as reactants are the lower alkanols including methanol, ethanol, propanol and isopropanol, phenol, substituted phenols such as p-methoxyphenol, aralkanols including benzyl alcohol, phenylethanol and phenylisopropanol, cycloalkanols including cyclopropanol, cyclopentanol and cyclohexanol, and haloalkanols such as 2-chloroethanol and 2,2,2-trichloroethanol.

Reaction between the 1,4-benzodioxyl-2-isocyanate and the alcohol can be effected by bringing the reactants together in a suitable inert liquid reaction medium such as toluene, benzene, ether, carbon tetrachloride, xylene and chloroform. Essentially anhydrous reaction conditions are desirable. Room temperature and somewhat higher, and even lower, temperatures therefrom are suitable for the reaction. At such temperatures the reaction goes to completion in a short time, three hours ordinarily being adequate. The product can be isolated by distilling off the solvent and purified by precipitation from an organic liquid in which it is insoluble.

Representative of the products that can be produced as described are:

Methyl N-[2-(1,4-benzodioxyl)] carbamate,
Propyl N-[2-(1,4-benzodioxyl)] carbamate,
Phenyl N-[2-(1,4-benzodioxyl)]carbamate,
Benzyl N-[2-(1,4-benzodioxyl)] carbamate,
Cyclohexyl N-[2-(1,4-benzodioxyl)] carbamate,
Methyl N-[2-(5-methyl-1,4-benzodioxyl)] carbamate,
Phenyl N-[2-(6-benzyl-1,4-benzodioxyl)] carbamate,
Benzyl N-[2-(8-trifluoromethyl-1,4-benzodioxyl)] carbamate, and
Ethyl N-[2-(7-methylthio-1,4-benzodioxyl)] carbamate.

The compounds of the invention in which B is an alkylene may also be prepared by treating an aminoalkyl-benzodioxane with an appropriately substituted haloformate. This process can be represented as follows:

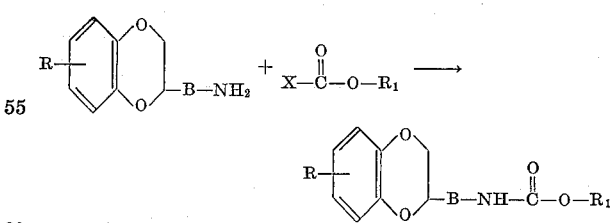

wherein X is a reactive halo group, preferably chloro, B is an alkylene, and R and $R_1$ have their assigned values.

Representative of the amines which can be used in the process are the following:

2-aminomethyl-1,4-benzodioxane,
2-(1-amino-2-propyl)-5-methyl-1,4-benzodioxane, and
2-(1-amino-2-ethyl)-8-trifluoromethyl-1,4-benzodioxane.

The amino (lower) alkyl-1,4-benzodioxanes employed as starting materials may be prepared by the various methods described in the literature, especially U.S. 3,149,108.

Some of the substituted haloformates which can be used as reactants are methyl chloroformate, ethyl chloroformate, propyl chloroformate, cyclopropyl chloroformate, cyclopenyl chloroformate, cyclohexyl chloroformate, phenyl chloroformate, p-methoxyphenyl chloroformate, benzyl chloroformate, phenethyl chloroformate and 3,4-methylenedioxy benzyl chloroformate.

The reaction of the amine with the haloformate can be readily effected by combining the reactants in a suitable liquid reaction medium such as carbon tetrachloride, chloroform, ethylene dichloride, benzene, xylene, toluene, acetone and pyridine. A basic hydrogen halide acceptor is advisably included in the reaction mixture to neutralize the released hydrogen halide. Triethylamine, pyridine and other basic materials may be used for this purpose. The reaction is generally readily effected at room temperature, although higher or lower temperatures are sometimes found more satisfactory. Following the reaction, the mixture can be diluted with water and the desired carbamate isolated by distillation when an oil, or filtration when a solid.

Some of the carbamates of this invention which may be produced as described above are:

Methyl N-[2-(1,4-benzodioxylmethyl)] carbamate,
Phenyl N-[2-(1,4-benzodioxylethyl)] carbamate,
Benzyl N-[2-(1,4-benzodioxylisopropyl)] carbamate,
Cyclohexyl N-[2-(7-chloro-1,4-benzodioxylmethyl)] carbamate, and
Methyl N-[2-(8-trifluoromethyl-1,4-benzodioxylpropyl)] carbamate.

The compounds of this invention in animals are central nervous system depressants. They are also skeletal muscle relaxants useful in the control of skeletal muscle pain, lower back pain and muscle stiffness. They are also indicated to have analgetic properties.

Methyl N-[2-(1,4-benzodioxyl)] carbamate shows selective inhibition of the flexor reflex in the spinal cat when tested for its effect on monosynaptic (patellar) and polysynaptic (anterior tibialis flexor) reflexes.

These compounds are advisably used for the described pharmacological purposes in unit dosage pharmaceutical forms such as tablets, capsules, powders and suppositories. Such unit dosage forms are formulated to contain an effective but safe amount of the drug, advisably from 2 to 200 mg., and generally the weight of the drug therein will be about 1.0 to 50.0% by weight of the unit dose. The unit dosage forms are advisably formulated with an inert carrier or diluent to obtain a convenient size to dosage ratio and thus facilitate handling. A typical tablet can have the composition:

| | Mg. |
|---|---|
| Methyl N-[2-(1,4-benzodioxyl)] carbamate | 20 |
| Starch, U.S.P. | 57 |
| Lactose, U.S.P. | 73 |
| Talc, U.S.P. | 9 |
| Stearic acid | 6 |

The following examples are presented to illustrate the invention:

*Example 1.—Methyl N-[2-(1,4-benzodioxyl)] carbamate*

A solution of 20.0 g. (0.1 mole) of 2-(1,4-benzodioxane)-carbonyl chloride in 100 ml. of anhydrous toluene was added in one hour to a slurry of 42.5 g. (0.65 mole) of sodium azide in 100 ml. of anhydrous toluene at 50° C. It was then refluxed 15 hours, cooled to room temperature and filtered in vacuo. To the filtrate was added slowly 3.5 g. (0.11 mole) of methyl alcohol, and heated 0.3 hours to reflux and maintained there two hours. It was then cooled to room temperature, taken to dryness in vacuo to yield a clear syrup which was ground under heptane to yield a crystalline solid which was recrystallized from methyl alcohol to yield methyl N-[2-(1,4-benzodioxyl)] carbamate, M.P. 76–80° C.

*Analysis.*—Calcd. for $C_{10}H_{22}NO_4$: C, 57.41; H, 5.30; N, 6.71. Found: C, 57.39; H, 5.15; N, 6.72.

*Example 2.—Benzyl N-[2-(1,4-benzodioxyl)] carbamate*

A solution of 20.0 g (0.1 mole) of 2-(1,4-benzodioxane)- carbonyl chloride in 175 ml. of anhydrous toluene was added in 0.5 hour to a slurry of 42.5 g. (0.65 mole) of sodium azide in 75 ml. of anhydrous toluene at 50° C. It was then refluxed 15 hours, cooled to room temperature and filtered in vacuo. To the filtrate was added slowly 11.0 g. (0.12 mole) of benzyl alcohol and refluxed 2 hours. It was then cooled to room temperature, taken to dryness in vacuo to yield a clear syrup which crystallized upon standing. It was recrystallized twice from methyl alcohol and twice from isopropyl alcohol to yield benzyl N-[2-(1,4-benzodioxyl)] carbamate, M.P. 86–88° C.

*Analysis.*—Calcd. for $C_{16}H_{15}NO_4$: C, 67.35; H, 5.30; N, 4.91. Found: C, 67.53; H, 5.40; N, 4.80.

*Example 3.—n-Butyl N-[2-(1,4-benzodioxyl)] carbamate*

A filtered solution of 40 g. of 2-(1,4-benzodioxane)-carbonyl chloride in 300 cc. of anhydrous toluene was added dropwise to a suspension of 85 g. of sodium azide in 300 cc. of anhydrous toluene while the temperature was maintained at 50–60° C. The mixture was heated at reflux for 21 hours and filtered from the insoluble salts.

A 150 ml. aliquot of the solution was added to 10 cc. of n-butanol and the mixture refluxed for 2.5 hours. The solvent was removed and the residue dissolved in ether. The ether solution was extracted with dilute sodium was removed under reduced pressure yielding n-butyl N-[2-(1,4-benzodioxyl)] carbamate, M.P. 70–73° C. Recrystallization from a 5:1 n-hexane-carbon tetrachloride mixture gave the pure n-butyl N-[2-(1,4-benzodioxyl)] carbamate, M.P. 72–74° C.

*Analysis.*—Calcd. for $C_{13}H_{17}NO_4$: C, 62.14; H, 6.82; N, 5.58. Found: C, 61.98; H, 6.74; N, 5.54.

*Example 4*

Each of the derivatives listed in the following table was prepared according to the precedure of Example 3 using cyclohexanol, isopropanol and phenol as the alcohol reactants.

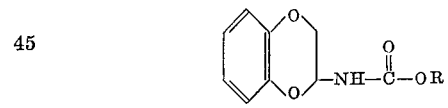

| R | M.P., °C. | Anal., Calcd. | | | Anal., Found | | |
|---|---|---|---|---|---|---|---|
| | | C | H | N | C | H | N |
| Cyclohexyl | 140–142.5 | 63.96 | 6.91 | 5.06 | 64.09 | 6.74 | 5.36 |
| Isopropyl | 91–93.5 | 60.75 | 6.37 | 5.90 | 60.75 | 6.45 | 5.98 |
| Phenyl | 129–130 | 66.42 | 4.83 | 5.17 | 66.20 | 4.76 | 5.37 |

*Example 5.—2,2,2-trichloroethyl N-[2-(1,4-benzodioxyl)] carbamate*

A solution of 8.3 g. of 1,4-benzodioxane-2-carbonyl chloride in 65 ml. of anhydrous toluene was added rapidly dropwise to a suspension of 16.8 g. of sodium azide in 65 ml. of anhydrous toluene heated to 60° C. The mixture was refluxed for 19 hours, the salts were filtered and 10 ml. of trichloroethanol was added to the filtrate. The resulting solution was refluxed for 4 hours, cooled and washed with dilute hydrochloric acid, water, dilute potassium hydroxide and water. After drying over magnesium sulfate, the solvent was removed with a stream of air leaving a residual oil. The material obtained on extraction of this oil with several portions of hot n-hexane crystallized to give the crude product, M.P. 81–84° C. After several recrystallizations from n-hexane the purified trichloroethyl carbamate was obtained, M.P. 85–87° C.

*Analysis.*—Calcd. for $C_{11}H_{10}Cl_3NO_4$: C, 40.46; H, 3.08; Cl, 32.58; N, 4.29. Found: C, 40.61; H, 3.05; Cl, 32.83; N, 4.56.

*Example 6.—Methyl N-[2-(1,4-benzodioxylmethyl)] carbamate*

A mixture of 16.5 g. of 2-aminomethyl-1,4-benzodioxane, 20.2 g. of triethylamine and 50 ml. of chloroform is cooled in a cold water bath and 10.0 g. of methyl chloroformate in 50 ml. of chloroform added dropwise. A precipitate forms during the addition which subsequency dissolves. Stirring is continued at room temperature for 24 hours, after which the reaction mixture is washed with water, dilute hydrochloric acid and finally with water again. After drying over magnesium sulfate and removal of the solvent, the residue is distilled to give 10.2 g. of a viscous oil, B.P. 147–152°/0.32 mm. Redistillation gives methyl N-[2-(1,4-benzodioxylmethyl)] carbamate in the form of analytically pure material, B.P. 156–158°/0.5 mm.

*Analysis.*—Calcd. for $C_{11}H_{13}NO_4$: C, 59.18; H, 5.87; N, 6.28. Found: C, 59.31; H, 6.01; N, 6.18.

*Example 7.—p-Methoxyphenyl N-[2-(1,4-benzodioxyl)] carbamate*

A solution of 150 g. of 2-(1,4-benzodioxane)-carbonyl chloride in 400 ml. of anhydrous toluene is added in a rapid dropwise fashion to a mixture of 310 g. of sodium azide and 500 ml. of anhydrous toluene at 65–70° C. The mixture is refluxed for 15 hours, cooled, the salts filtered and the filter cake washed with toluene until the filtrate has a volume of 1000 ml.

A 100 ml. aliquot of the above isocyanate solution is refluxed for three hours with 10.0 g. of p-methoxyphenol. The mixture is cooled, washed with water, dilute sodium hydroxide and water. After drying over calcium chloride, the solvent is concentrated to a small volume, diluted with hexane and filtered to give p-methoxyphenyl N-[2-(1,4-benzodioxyl)] carbamate, M.P. 117–120° C.

*Anaylsis.*—Calcd. for $C_{16}H_{15}NO_5$: N, 4.65. Found: N, 4.90.

Various changes and modifications of the invention can be made and, to the extent that such variations incorporate the spirit of this invention, they are intended to be included within the scope of the appended claims.

What is claimed is:

1. A compound of the formula

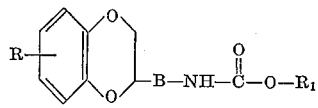

wherein R is a member of the group consisting of hydrogen, halo, lower alkyl, lower alkoxy, phenyl, benzyl, halo-lower alkyl and lower alkyl-thio, $R_1$ is a member of the group consisting of lower alkyl, phenyl, lower alkoxy-phenyl, phenyl-lower alkyl, cycloalkyl having 3 to 7 carbons in the ring and halo-lower alkyl, and B is a member of the group consisting of a single chemical bond and lower alkylene.

2. Lower alkyl N-[2-(1,4-benzodioxyl)] carbamate.

3. Methyl N-[2-(1,4-benzodioxyl)] carbamate.
4. Phenyl-lower alkyl N-[2-(1,4-benzodioxyl)] carbamate.
5. Benzyl N-[2-(1,4-benzodioxyl)] carbamate.
6. n-Butyl N-[2-(1,4-benzodioxyl)] carbamate.
7. Isopropyl N-[2-(1,4-benzodioxyl)] carbamate.
8. Cycloalkyl N-[2-(1,4-benzodioxyl)] carbamate in which the cycloalkyl has 3 to 7 carbons in the ring.
9. Cyclohexyl N-[2-(1,4-benzodioxyl)] carbamate.
10. Phenyl N-[2-(1,4-benzodioxyl)] carbamate.
11. 2,2,2-trichloroethyl N-[2-(1,4-benzodioxyl)] carbamate.
12. p-Methoxyphenyl N-[2-(1,4-benzodioxyl)] carbamate.
13. Methyl N-[2-(1,4-benzodioxylmethyl)] carbamate.
14. Lower alkyl N-[2-(1,4-benzodioxyl lower alkyl)] carbamate.
15. A pharmaceutical composition in unit dosage form comprising about 2 to 200 mg. of a compound of the formula

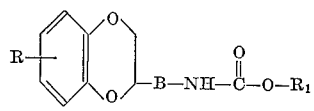

wherein R is a member of the group consisting of hydrogen, halo, lower alkyl, phenyl, benzyl, halo-lower alkyl and lower alkyl-thio, $R_1$ is a member of the group consisting of lower alkyl, phenyl, lower alkoxy-phenyl, phenyl-lower alkyl, cycloalkyl having 3 to 7 carbons in the ring and halo-lower alkyl, and B is selected from the group consisting of a single chemical bond and lower alkylene, intermixed with a pharmaceutical carrier.

16. The method of effecting skeletal muscle relaxation in an animal which comprises administering to said animal a safe but effective amount of a compound of the formula

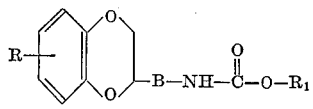

wherein R is a member of the group consisting of hydrogen, halo, lower alkyl, phenyl, benzyl, halo-lower alkyl and lower alkyl-thio, $R_1$ is a member of the group consisting of lower alkyl, phenyl, lower alkoxy-phenyl, phenyl-lower alkyl, cycloalkyl having 3 to 7 carbons in the ring and halo-lower alkyl, and B is selected from the group consisting of a single chemical bond and lower alkylene.

References Cited

UNITED STATES PATENTS 3,185,692    5/1965    Judd _____ 260—340.3

ALBERT T. MEYERS, *Primary Examiner.*

SAM ROSEN, *Examiner.*

S. J. FRIEDMAN, *Assistant Examiner.*